Figure 1:
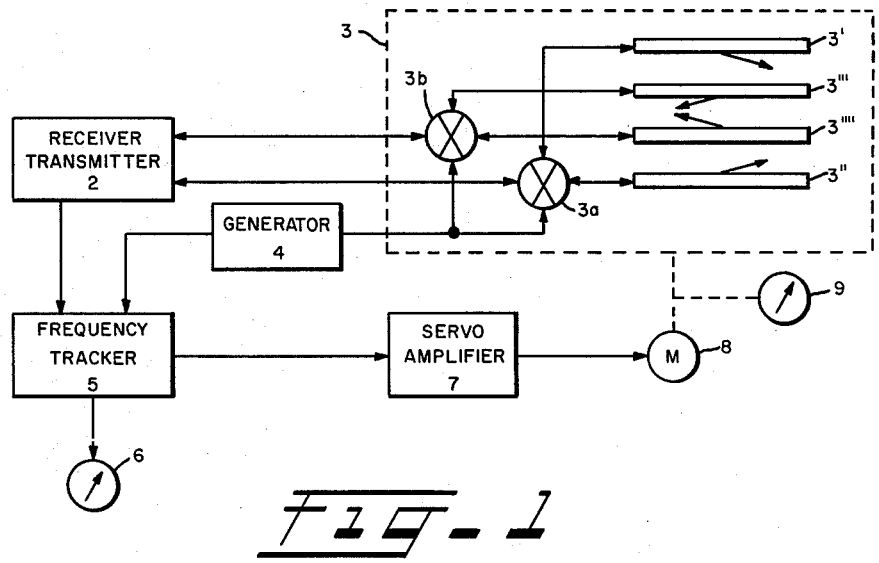

May 1, 1962            G. STAVIS            3,032,758

COHERENT CONTINUOUS WAVE DOPPLER NAVIGATION SYSTEM

Filed July 6, 1959            3 Sheets-Sheet 1

*INVENTOR.*
GUS STAVIS

BY

ATTORNEY.

May 1, 1962  G. STAVIS  3,032,758
COHERENT CONTINUOUS WAVE DOPPLER NAVIGATION SYSTEM
Filed July 6, 1959  3 Sheets-Sheet 3

INVENTOR.
GUS STAVIS

BY

ATTORNEY.

United States Patent Office 3,032,758
Patented May 1, 1962

3,032,758
COHERENT CONTINUOUS WAVE DOPPLER
NAVIGATION SYSTEM
Gus Stavis, Briarcliff Manor, N.Y., assignor to General
Precision Inc., a corporation of Delaware
Filed July 6, 1959, Ser. No. 825,292
12 Claims. (Cl. 343—9)

This invention relates to Doppler radar navigation systems and more particularly to receiver transmitters suitable for use in continuous wave coherent Doppler radar navigation systems.

Continuous wave Doppler radar navigation systems for aircraft offer tremendous efficiency advantages over frequency modulated or pulsed systems. The increase in efficiency referred to above becomes quite important as the altitude and speed of an aircrat is increased. However, pure continuous wave systems present serious problems in accuracy, reliability and instrumentation which are responsible for the overwhelming choice of the relatively inefficient frequency modulated and pulsed Doppler navigation systems.

One object of this invention is to provide a Doppler radar navigation system which employs continuous wave transmission that is accurate, reliable, low in weight, and easily manufactured.

Another object is to provide a Doppler radar navigation system which has a low power requirement and is suitable for use in high speed aircraft which have wide altitude ranges.

A further object of the invention is to provide a Doppler radar navigation system which is coherent in operation and which will permit normal operation during excessive aircraft maneuvers about the various control axes.

The invention contemplates a receiver transmitter for use in a continuous wave coherent Doppler radar navigation system including first means for providing two radio waves displaced in frequency from each other by a predetermined amount, a duplexer for applying the two radio waves to an antenna and for providing an output for the Doppler frequency shifted echo wave received by the antenna, and second means connected to the duplexer output and the output from the first means for mixing the radio waves and the echo waves to provide an output having two frequency spectra each having its central frequency displaced an equal amount from a frequency corresponding to the difference in frequency between the two radio waves and being separated in frequency from each other by an amount corresponding to the velocity of the vehicle being navigated.

The foregoing and other objects and advantages of the invention will appear more clearly from a consideration of the specification and drawings wherein one embodiment of the invention is described and shown in detail for illustration purposes only.

Figure 2:
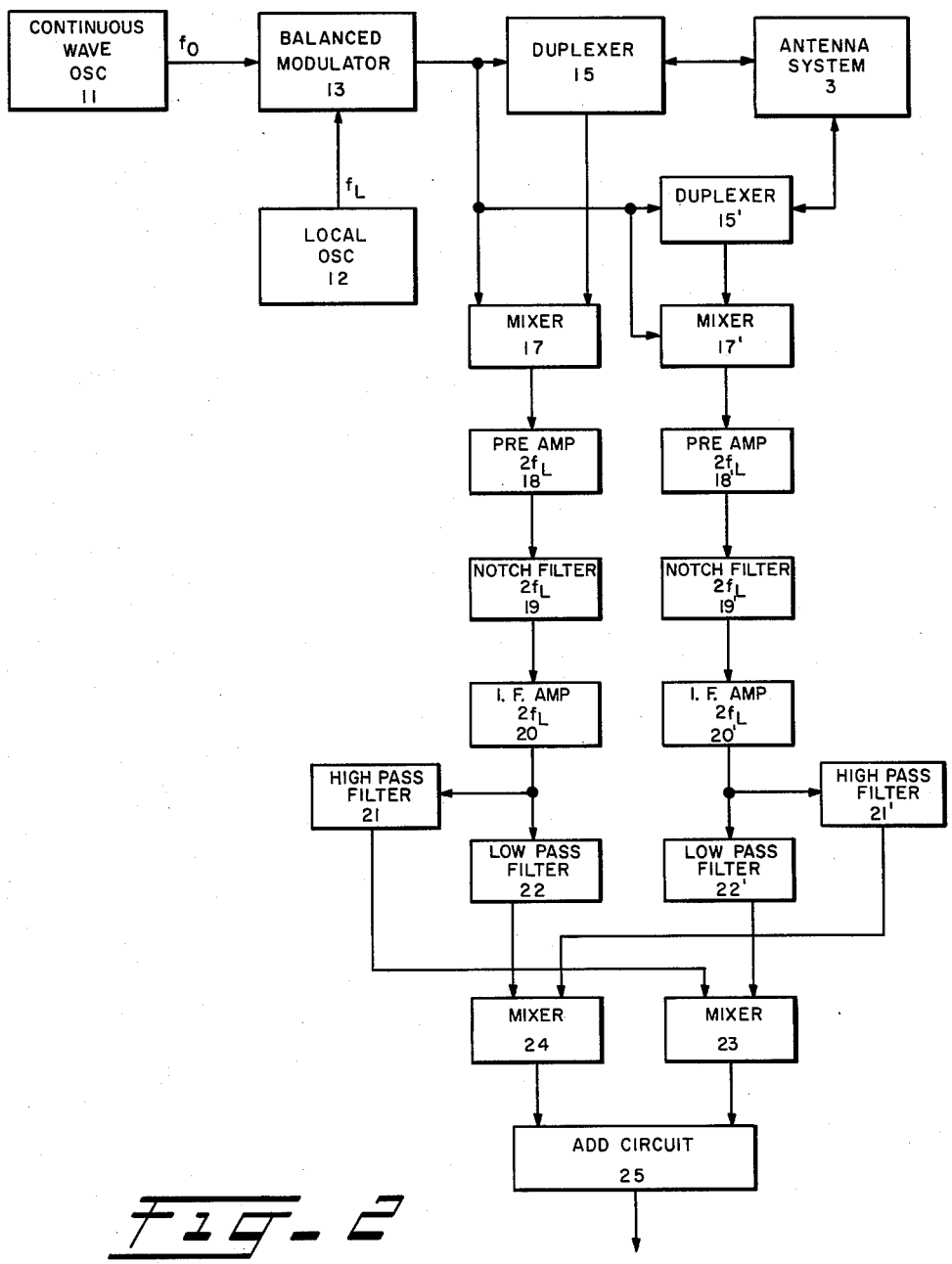
Figure 5:
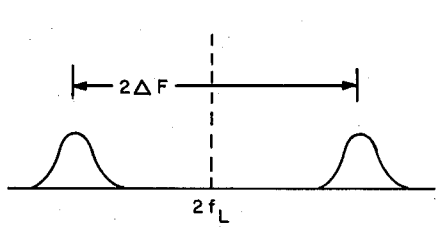

In the drawings:
FIGURE 1 is a block diagram of a coherent continuous wave Doppler navigation system constructed in accordance with the invention.
FIGURE 2 is a block diagram of the novel receiver transmitter used in the system of FIG. 1; and
FIGURE 3-8, inclusive, are graphs of power vs. frequency for various signals in different components of the system.

In FIG. 1, a novel receiver transmitter 2 supplies two continuous radio waves, displaced in frequency from each other by a predetermined amount, to an antenna system 3 which has four linear arrays 3', 3'', 3''' and 4''''. Arrays 3' and 3'' are connected through a switch 3a to transmitter 2 and radiate energy alternately. Arrays 3''' and 3'''' are connected through a switch 3b to transmitter 2 and radiate energy alternately. Switches 3a and 3b are arranged so that arrays 3' and 3'''' are energized simultaneously to direct beams fore right and aft left, respectively; and arrays 3'' and 3''' are energized simultaneously to direct beams fore left and aft right, respectively. Both signals are supplied simultaneously through two separate channels to produce one fore and one aft antenna lobe at any given time. A switching generator 4 operates switches 3a and 3b in the antenna system so that the fore and aft antenna lobes are alternately produced. The fore right and the aft left antenna lobes are produced simultaneously in one cycle of switching generator 4 and the fore left and the aft right antenna lobes are produced simultaneously in the next cycle and the sequence described continuously repeated during the operation of the system.

A portion of the energy radiated by each antenna array and back scattered by the earth is received by the antenna array. The frequency of the received energy has undergone the well known Doppler frequency shift given by the equation $$\Delta f = \frac{2V}{C} \times f_\mathrm{T} \times \cos \gamma$$

where:

$\Delta f$=Doppler frequency shift
$V$=ground speed of the aircraft
$C$=speed of propagation of the radio waves
$\gamma$=the looking angle (the angle from the line of flight to the direction of the beam)
$f_\mathrm{T}$= the frequency of the transmitter radio waves Receiver transmitter 2 amplifies and passes only those waves which correspond to the Doppler frequency shift or the change in frequency $\Delta f$ due to the velocity of the craft radiating the energy toward the earth. A frequency tracker 5 connected to the output of receiver transmitter 2 tracks the Doppler frequency shift and supplies an output proportional thereto to an indicator 6 which may be calibrated in knots or miles per hour. Indicator 6 once calibrated will provide an accurate indication of ground speed of the craft provided the angle between the ground track and the normal projection of the radiated beam does not change.

Should the antenna fail to follow the ground track, the Doppler frequency shift in the energy received by the fore right and aft left arrays of the antenna will increase or decrease depending on the direction of change in the angle between the radiated beams and the ground track and the opposite condition will take place regarding the Doppler frequency shift in the energy received by the fore left and aft right arrays of the antenna. Thus, frequency tracker 5 includes means for comparing the frequency of the received energy during successive cycles of generator 4 to provide phase sensitive error signals when they are not equal. The error signals are applied to a servo amplifier 7 which energizes a motor 8 to rotate antenna system 3 to null the error signal and thus place antenna system 3 in line with the craft's ground track. An indicator 9 calibrated in degrees is connected to motor 8 and provides a reading indicating the deviation of the antenna system from the longitudinal axis of the craft, which deviation is equal to the drift angle since the antenna is aligned with the ground track.

Only the novel receiver transmitter briefly described above will be described in detail since the other components are conventional and any number of different components might be substituted. The novel receiver transmitter can be substituted for the receiver transmitter disclosed by Frank A. McMahon in his article "The AN/APN–81 Doppler Navigation System"; p. 202, IRE Transactions on "Aeronautical and Navigational Electronics"; December 1957. Such a substitution would require only a minor modification of the antenna system to provide separate paths to the antenna system to produce the fore and aft lobes, respectively. Otherwise the substitution is straight forward and provides an accurate, reliable and highly efficient coherent continuous wave Doppler navigation system.

In FIG. 2, a continuous wave oscillator 11 and a local oscillator 12 supply electric energy having frequencies $f_O$ and $f_L$, respectively, to a balanced modulator 13 which suppresses all but the sum and difference frequencies of $f_O$ and $f_L$. The upper side band frequency, $f_O+f_L$, and lower side band frequency, $f_O-f_L$, are applied simultaneously to a pair of duplexers 15 and 15'. Duplexer 15 is alternately connected to the antenna assembly to produce the fore right and left antenna lobes and duplexer 15' is alternately connected to the antenna assembly to produce aft left and right antenna lobes.

The echo signals received by the fore lobes have a frequency of $f_O+f_L+\Delta F$ and $f_O-f_L+\Delta F$, where $\Delta F$ is the Doppler frequency shift referred to earlier. The echo signal received by the aft lobes have a frequency of $f_O+f_L-\Delta F$ and $f_O-f_L-\Delta F$, where $\Delta F$ is again the Doppler frequency shift.

Figures 3A, 3B:
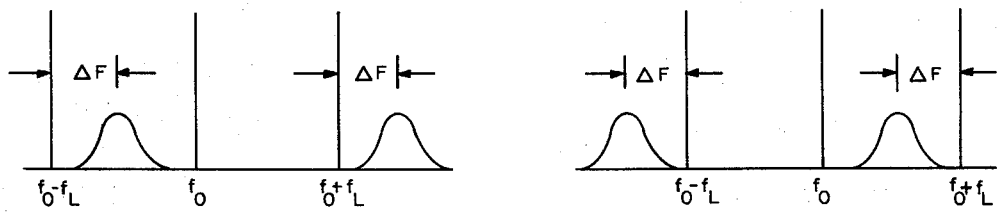
Figure 4:
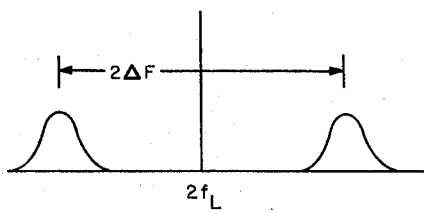

The echo signals from the fore antenna lobes are applied to a mixer 17 via duplexer 15 and the echo signals from the aft antenna lobes are applied to a mixer 17' via duplexer 15'. The output from balanced modulator 13 is also applied directly to mixers 17 and 17'. The frequencies applied to mixers 17 and 17' are shown in FIGS. 3a and 3b, respectively, and include vestigial $f_O$, due to the imperfect nature of the balanced modulator 13, the upper and lower side bands $f_O+f_L$ and $f_O-f_L$, respectively, and the echo signals $f_O+f_L+\Delta F$ and $f_O-f_L+\Delta F$ in the case of mixer 17, and $f_O+f_L-\Delta F$ and $f_O-f_L-\Delta F$ in the case of mixer 17'. Of the frequencies supplied by each mixer, that is that sum and difference of the frequencies for each mixer listed above, only those located near $2f_L$ are of concern since the outputs from mixers 17 and 17' are applied to two preamplifiers 18 and 18', respectively, each of which amplifies and passes only a narrow band of frequencies centered at $2f_L$. Thus, preamplifiers 18 and 18' each pass and amplify two spectra, one having a central frequency of $2f_L-\Delta F$ and the other $2f_L+\Delta F$, and a large spike of energy at $2f_L$, shown graphically in FIG. 4. The outputs of preamplifiers 18 and 18' are each passed through notch filters 19 and 19', respectively, which remove the large spike of energy at the frequency of $2f_L$. Notch filters 19 and 19' may have a band width of twice the lowest Doppler frequency of interest less the band width associated with that frequency. The output of notch filters 19 and 19' are applied to a pair of I.F. amplifiers 20 and 20', respectively, and each provide an output shown graphically in FIG. 5. The central frequency of the lower spectra of FIG. 5 equals $2f_L-\Delta F$ and the central frequency of the upper spectra equals $2f_L+\Delta F$.

Under certain conditions which will be outlined in detail the outputs of I.F. amplifiers 20 and 20' may be utilized without the remaining structure shown in FIG. 2 by mixing the spectra from amplifier 20 to obtain a frequency of $2\Delta F$ and adding the mixed output $2\Delta F$ to the mixed output from amplifier 20' which is also equal to $2\Delta F$. These combined outputs may then be applied directly to the frequency tracker.

This technique is adequate when the altitude is limited so that the transit time of the radiated signal to the ground and back is less than the rate of any random frequency modulation of the continuous wave oscillator so that coherence is maintained and no smearing or broadening of the spectra at $2\Delta F$ results. On the other hand, this technique may be used in all altitude ranges if the frequency output of the continuous wave oscillator is stabilized since coherence will then be maintained at all altitudes.

In those instances where stabilization is not practical and where an unlimited altitude range is required the adverse effects of random frequency modulations of the continuous wave oscillator can be overcome by passing the outputs of amplifiers 20 and 20' through separate high and low pass filters 21, 22 and 21' 22', respectively; and mixing the output of high pass filter 21 and low pass filter 22' in a mixer 23; and the output of low pass filter 22 and high pass filter 21' in a mixer 24; and combining the outputs of mixers 23 and 24 in an addition circuit 25.

Figure 6:
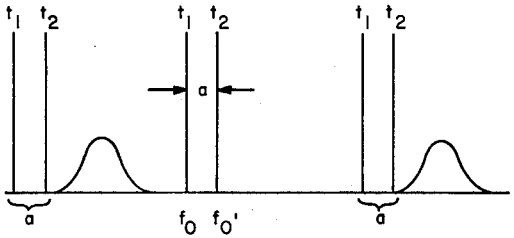
Figure 7A:
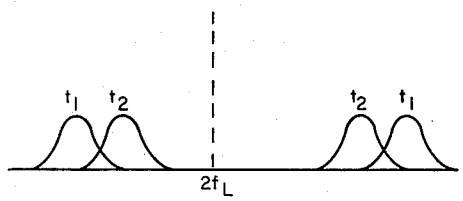
Figure 7B:
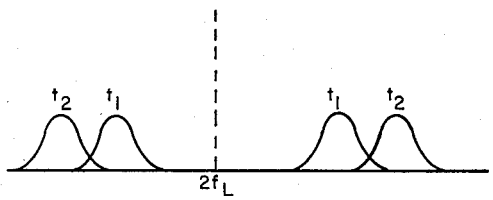

The effects of incidental or deliberate frequency modulation of the continuous wave oscillators on the signals throughout the system are shown graphically in FIGS. 6–8. In FIG. 6, the frequency of the continuous oscillator at time $t_1$ is $f_O$ and the lower and upper side bands $f_O-f_L$ and $f_O+f_L$, respectively. These side bands are radiated by the forward directed portions of the antenna system and the reflected energy undergoes the Doppler frequency shift to become $(f_O-f_L+\Delta F)$ and $(f_O+f_L+\Delta F)$. At time $t_2$, which is the time required for transit, $f_O$ changes to $f_O'$, which is greater than $f_O$ by an amount "$a$." This results in a change in frequency of the side bands which are mixed with the Doppler shifted echo to $f_O'-f_L$ and $f_O'+f_L$; or $(f_O+a)-f_L$ and $(f_O+a)+f_L$ which results in a shift in the spectra appearing at the output of the associated preamplifier. This shift is shown graphically in FIG. 7a. In the case of the rearwardly directed beams, the shift is in the opposite direction and is shown graphically in FIG. 7b.

Figure 8A:
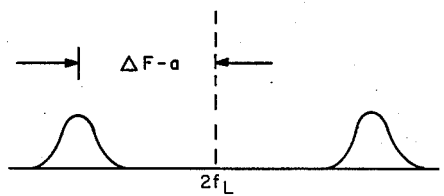
Figure 8B:
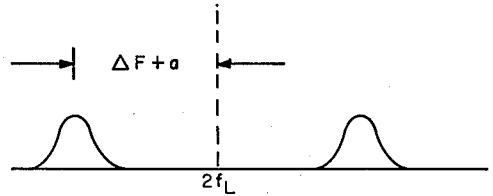
Figure 9A:
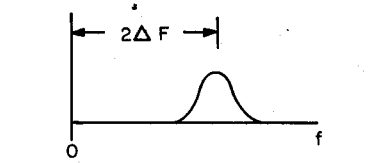
Figure 9B:
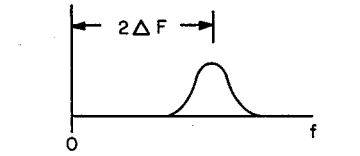

FIGS. 8a and 8b show graphically the outputs of I.F. amplifiers 20 and 20', respectively. Filters 21, 22 and 21', 22' combine to mix the lower spectrum in FIG. 8a with the upper spectrum in FIG. 8b in mixer 24 and the lower spectrum in FIG. 8b with the upper spectrum in FIG. 8a in mixer 23 to wash out the smearing due to frequency instability. It should be noted at this point that the lower spectrum in FIG. 8a and the upper spectrum in FIG. 8b are derived from the same side band and the upper spectrum in FIG. 8a and the lower spectrum in FIG. 8b are derived from the other side band. The outputs of mixers 23 and 24 are shown graphically in FIGS. 9a and 9b, respectively. These outputs are combined in adding circuit 25 from where they are applied to the frequency tracker of FIG. 1. The outputs from mixers 23 and 24 are two spectra the center frequencies of which are $2\Delta F$ and when combined in circuit 25 provide a single spectrum having a center frequency $2\Delta F$ to yield the maximum signal-to-noise ratio obtainable with the system.

In the embodiment chosen for illustration the two frequencies applied to the antenna system and mixers 17 and 17' are obtained by modulating the output of the continuous wave oscillator 11 with the output of the local oscillator 12 in a balanced modulator 13. Another technique which will provide equally good results is to utilize a pair of continuous wave oscillators and feed both outputs directly to the antenna system and the mixers 17 and 17'.

While only one embodiment of the invention has been shown and described in detail for illustration purposes, it is to be expressly understood that the invention is not to be limited thereto.

What is claimed is:

1. A receiver transmitter for use in a continuous wave Doppler radar navigation system including first means for providing two continuous radio waves displaced in frequency from each other by a predetermined amount, a duplexer for applying the two radio waves to an antenna system which radiates the radio waves toward the ground and receives the Doppler shifted echo waves and for providing an output for the said Doppler frequency shifted echo waves, and second means connected to the duplexer output and the output from the first means for mixing the radio waves and the echo waves to provide an output having two frequency spectra each having its central frequency displaced an equal amount from a frequency corresponding to the difference in frequency between the two radio waves and being separated in frequency from each other by an amount corresponding to the velocity of the vehicle being navigated.

2. A receiver transmitter for use in a continuous wave Doppler radar navigation system including, a continuous wave oscillator, a local oscillator, modulating means for providing sum and difference frequencies of the continuous wave oscillator and the local oscillator frequencies, a duplexer for connecting the modulator output to an antenna and for providing an output for the Doppler frequency shifted echo signals received by the antenna, and means connected to the duplexer output and the modulator output for mixing the echo signals and the modulator output and for utilizing only the sum and difference frequencies and the echo signals to provide an output having two frequency spectra each having its central frequency displaced an equal amount from a frequency corresponding to twice the local oscillator frequency and being separated in frequency from each other by an amount corresponding to the velocity of the vehicle being navigated.

3. A receiver transmitter for use in a continuous wave Doppler navigation system including first means for providing two continuous radio waves displaced from each other in frequency by a predetermined amount, a duplexer for applying the two radio waves to an antenna and for providing an output for the Doppler frequency shifted echo waves received by the antenna, a mixer connected to the duplexer output and to the output of the first means for providing sum and difference frequencies of the two radio waves and the echo signals, second means connected to the output of the mixer for filtering the output and passing two frequency spectra each having its central frequency displaced an equal amount from a frequency corresponding to the difference in frequency between the two radio waves and being separated in frequency from each other by an amount corresponding to the velocity of the vehicle being navigated.

4. A receiver transmitter as defined in claim 3 in which the second means connected to the mixer output includes a preamplifier for amplifying and passing a narrow band of frequencies centered at a frequency substantially equal to the difference in frequency between the two radio waves, and a notch filter centered at the said difference frequency in series therewith.

5. A receiver transmitter for use in a continuous wave Doppler radar navigation system including, a continuous wave oscillator, a local oscillator, modulating means for providing sum and difference frequencies of the continuous wave oscillator and the local oscillator frequencies and for suppressing the oscillator frequencies, a duplexer for connecting the modulator output to an antenna and for providing an output for the Doppler frequency shifted echo signals received by the antenna, a mixer connected to the duplexer output and to the modulator output for providing sum and difference frequencies of the modulator output and the echo signals, means connected to the mixer output for filtering the output and passing two frequency spectra each having its central frequency displaced an equal amount from a frequency corresponding to twice the local oscillator frequency and being separated in frequency from each other by an amount corresponding to the velocity of the vehicle being navigated.

6. A receiver transmitter as set forth in claim 5 in which the filtering means connected to the mixer output includes a preamplifier for amplifying and passing a narrow band of frequencies centered at a frequency equal to twice the local oscillator frequency, and a notch filter in series therewith centered at the same frequency.

7. A receiver transmitter for use in a continuous wave Doppler radar navigation system including generating means for providing two continuous radio waves displaced in frequency from each other by a predetermined amount, a first duplexer for applying the two radio waves to an antenna system for transmission in one direction relative to the movement of the vehicle being navigated and for providing an output for the Doppler frequency shifted echo waves reflected in said one direction and received by said antenna system, a second duplexer for applying the two radio waves to said antenna system for transmission in an opposite direction and for providing an output for the Doppler frequency shifted echo waves reflected in said opposite direction and received by the said antenna system, first means connected to the first duplexer output and the generating means output for mixing the radio waves and the echo waves from the first duplexer to provide an output having two frequency spectra each having its central frequency displaced an equal amount from a frequency corresponding to the difference in frequency between the two radio waves and being separated in frequency from each other by an amount corresponding to the velocity of the vehicle being navigated, second means connected to the second duplexer output and the generating means output for mixing the radio waves and the echo waves from the second duplexer to provide an output having two frequency spectra each having its central frequency displaced an equal amount from a frequency corresponding to the difference in frequency between the two radio waves and being separated in frequency from each other by an amount corresponding to the velocity of the vehicle being navigated, and means connected to the first and second means for mixing the lower and upper spectro from said first means together and the lower and upper spectra from said second means together and for combining the mixed spectra to provide a single spectrum having a central frequency corresponding to the Doppler frequency and the velocity of the vehicle.

8. A receiver transmitter as set forth in claim 7 wherein said generating means for providing two continuous radio waves displaced in frequency from each other comprises, a continuous wave oscillator, a local oscillator, and balanced modulating means for providing sum and difference frequencies of the continuous wave oscillator and the local oscillator frequencies and for suppressing the oscillator frequencies.

9. A receiver transmitter as set forth in claim 7 in which the first and second means connected to the first and second duplexers, respectively, each include a preamplifier for amplifying and passing a narrow band of frequencies centered at a freqency substantially equal to the difference in frequency between the two radio waves, and a notch filter centered at the said difference frequency in series therewith.

10. A receiver transmitter for use in a continuous wave Doppler radar navigation system including generating means for providing two continuous radio waves displaced in frequency from each other by a predetermined amount, a first duplexer for applying the two radio waves to an antenna system for transmission in one direction relative to the movement of the vehicle being navigated and for providing an output for the Doppler frequency shifted echo waves received by the said antenna system, a second duplexer for applying the two radio waves to said antenna system for transmission to an opposite direction and for providing an output for the Doppler frequency shifted echo waves reflected in said opposite direction and received by the said antenna system, first means connected to the first duplexer output and the generating means output for mixing the radio waves and the echo waves from the first duplexer to provide an output having two frequency spectra each having its central frequency displaced an equal amount from a frequency corresponding to the difference in frequency between the two radio waves and being separated in frequency from each other by an amount corresponding to the velocity of the vehicle being navigated, second means connected to the second duplexer output and the generating means output for mixing the radio waves and the echo waves from the second duplexer to provide an output having two frequency spectra each having its central frequency displaced an equal amount from a frequency corresponding to the difference in frequency between the two radio waves and being separated in frequency from each other by an amount corresponding to the velocity of the vehicle being navigated, means connected to said first and second means for mixing together the lower spectrum from the first means and the upper spectrum from the second means to provide a first spectrum having a central frequency corresponding to the Doppler frequency and for mixing together the upper spectrum from the first means and the lower spectrum from the second means to provide a second spectrum having a central frequency corresponding to the Doppler frequency, and means for combining the first and second spectra to provide a single spectrum having a central frequency corresponding to the velocity of the vehicle.

11. A receiver transmitter as set forth in claim 10 wherein said generating means for providing two continuous radio waves displaced in frequency from each other comprises, a continuous wave oscillator, a local oscillator, and balanced modulating means for providing sum and difference frequencies of the continuous wave oscillator and the local oscillator frequencies and for suppressing the oscillator frequencies.

12. A receiver transmitter as set forth in claim 11 in which the first and second means connected to the first and second duplexers, respectively, each include a preamplifier for amplifying and passing a narrow band of frequencies centered at a frequency substantially equal to the difference in frequency between the two radio waves, and a notch filter centered at the said difference frequency in series therewith.

References Cited in the file of this patent
UNITED STATES PATENTS
2,883,656    Russell _____ Apr. 21, 1959